(12) United States Patent
Marunouchi (10) Patent No.: US 10,896,010 B1
(45) Date of Patent: Jan. 19, 2021

(54) IMAGE FORMING APPARATUS THAT SETS A STANDBY TIME BASED ON A JOB HISTORY AND CONTROL METHOD OF THE IMAGE FORMING APPARATUS

(71) Applicant: TOSHIBA TEC KABUSHIKI KAISHA, Tokyo (JP)

(72) Inventor: Atsushi Marunouchi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/587,548

(22) Filed: Sep. 30, 2019

(51) Int. Cl.
*G06F 15/00* (2006.01)
*G06F 3/12* (2006.01)
*G06K 1/00* (2006.01)

(52) U.S. Cl.
CPC .......... *G06F 3/1229* (2013.01); *G06F 3/1221* (2013.01); *G06F 3/1273* (2013.01)

(58) Field of Classification Search
CPC ..... G06F 3/1229; G06F 3/1221; G06F 3/1273
USPC ............... 358/1.13, 1.15, 1.14, 1.1
See application file for complete search history.

(56) References Cited

U.S. PATENT DOCUMENTS

| | | | | |
|---|---|---|---|---|
| 2010/0315665 | A1* | 12/2010 | Ebisui ................... | G06F 3/1213 358/1.14 |
| 2013/0050759 | A1* | 2/2013 | Tsuchiya ............... | G06F 3/1285 358/1.15 |
| 2020/0241821 | A1* | 7/2020 | Kurahashi ............. | G06F 3/1206 |

FOREIGN PATENT DOCUMENTS

| | | |
|---|---|---|
| JP | 2006-248047 A | 9/2006 |
| JP | 2017-105215 A | 6/2017 |

* cited by examiner

*Primary Examiner* — Douglas Q Tran
(74) *Attorney, Agent, or Firm* — Kim & Stewart LLP (57) ABSTRACT

An image forming apparatus includes a printer and a controller. The controller is configured to control an operational mode of the image forming apparatus to be one of a plurality of modes including a standby mode in which warming up is not performed before the next printing, and a sleep mode in which power consumption of the image forming apparatus is lower than power consumption in the standby mode and warming up is performed before the next printing. The controller is configured to set a standby time that the image forming apparatus is required to wait in the standby mode before transitioning into the sleep mode, based on a job history including the number print jobs performed on a prior day during a predetermined time period corresponding to the current time of day.

20 Claims, 6 Drawing Sheets

| NUMBER OF JOBS | 6 | 12 | 15 | 20 | 6 | 12 | 15 | 20 |
|---|---|---|---|---|---|---|---|---|
| WP POWER AMOUNT | 1212 | 1212 | 1212 | 1212 | 1212 | 1212 | 1212 | 1212 |
| WP TIME | 15 | 12 | 10 | 8 | 0 | 0 | 0 | 0 |
| PRINTING TIME | 5 | 5 | 5 | 5 | 5 | 5 | 5 | 5 |
| POST-PRINTING STANDBY TIME | 60 | 60 | 60 | 60 | 3600 | 3600 | 3600 | 3600 |
| SLEEP TIME | 3120 | 2676 | 2475 | 2140 | 0 | 0 | 0 | 0 |
| PRINTING POWER AMOUNT | 716 | 716 | 716 | 716 | 716 | 716 | 716 | 716 |
| SLEEP POWER AMOUNT | 41 | 41 | 41 | 41 | 41 | 41 | 41 | 41 |
| STANDBY POWER AMOUNT | 105 | 105 | 105 | 105 | 105 | 105 | 105 | 105 |
| STANDBY TIME | 360 | 720 | 900 | 1200 | 3570 | 3540 | 3525 | 3500 |
| POWER CONSUMPTION AMOUNT (SLEEP) | 35.5 | 30.5 | 28.2 | 24.4 | 0.0 | 0.0 | 0.0 | 0.0 |
| POWER CONSUMPTION AMOUNT (PRINTING) | 36.3 | 60.4 | 65.4 | 73.8 | 6.0 | 11.9 | 14.9 | 19.9 |
| POWER CONSUMPTION AMOUNT (STANDBY) | 10.5 | 21.0 | 26.3 | 35.0 | 104.1 | 103.3 | 102.8 | 102.1 |
| TOTAL POWER AMOUNT | 82.3 | 111.9 | 119.9 | 133.2 | 110.1 | 115.2 | 117.7 | 122.0 |

FIG. 4

|  | Mon | Tue | Wed | Thu | Fri | Sat | Sun |
|---|---|---|---|---|---|---|---|
| 0:00~0:59 | 0 | 0 | 0 | 0 | 0 | 0 | 0 |
| 1:00~1:59 | 0 | 0 | 0 | 0 | 0 | 0 | 0 |
| 2:00~2:59 | 0 | 0 | 0 | 0 | 0 | 0 | 0 |
| 3:00~3:59 | 0 | 0 | 0 | 0 | 0 | 0 | 0 |
| 4:00~4:59 | 0 | 0 | 0 | 0 | 0 | 0 | 0 |
| 5:00~5:59 | 0 | 0 | 0 | 0 | 0 | 0 | 0 |
| 6:00~6:59 | 0 | 0 | 0 | 0 | 0 | 0 | 0 |
| 7:00~7:59 | 0 | 0 | 0 | 0 | 0 | 0 | 0 |
| 8:00~8:59 | 0 | 0 | 3 | 0 | 0 | 0 | 0 |
| 9:00~9:59 | 5 | 1 | 14 | 5 | 5 | 0 | 0 |
| 10:00~10:59 | 6 | 6 | 11 | 6 | 6 | 0 | 0 |
| 11:00~11:59 | 4 | 4 | 4 | 4 | 4 | 0 | 0 |
| 12:00~12:59 | 1 | 0 | 1 | 2 | 0 | 0 | 0 |
| 13:00~13:59 | 5 | 5 | 5 | 5 | 5 | 0 | 0 |
| 14:00~14:59 | 12 | 4 | 5 | 19 | 16 | 0 | 0 |
| 15:00~15:59 | 17 | 8 | 4 | 4 | 14 | 0 | 0 |
| 16:00~16:59 | 5 | 5 | 5 | 5 | 5 | 0 | 0 |
| 17:00~17:59 | 2 | 2 | 1 | 2 | 2 | 0 | 0 |
| 18:00~18:59 | 1 | 1 | 0 | 1 | 1 | 0 | 0 |
| 19:00~19:59 | 0 | 0 | 0 | 0 | 2 | 0 | 0 |
| 20:00~20:59 | 1 | 1 | 0 | 1 | 0 | 0 | 0 |
| 21:00~21:59 | 0 | 0 | 0 | 0 | 0 | 0 | 0 |
| 22:00~22:59 | 0 | 0 | 0 | 0 | 0 | 0 | 0 |
| 23:00~23:59 | 0 | 0 | 0 | 0 | 0 | 0 | 0 |

IMAGE FORMING APPARATUS THAT SETS A STANDBY TIME BASED ON A JOB HISTORY AND CONTROL METHOD OF THE IMAGE FORMING APPARATUS

FIELD

Embodiments described herein relate generally to an image forming apparatus and a control method.

BACKGROUND

An image forming apparatus operates to reduce power consumption by transitioning into a sleep mode in response to an elapse of a predetermined standby time after printing has been performed. The image forming apparatus may set the standby time based upon its own operation times. However, if the standby time is determined in this manner, when the number of printing jobs per unit time has recently been large, then image forming apparatus might not shift to the sleep mode as quickly as would be advantageous from the standpoint of power consumption. Therefore, even though the image forming apparatus is capable of shifting to the sleep mode it fails to do so in a way that minimizes power consumption.

DETAILED DESCRIPTION

In general, according to an embodiment, an image forming apparatus includes a printer and a controller configured to control the printer to execute a print job. The controller is configured to control an operational mode of the image forming apparatus to be one of a plurality of modes including a standby mode in which warming up is not performed before the next printing, and a sleep mode in which power consumption of the image forming apparatus is lower than power consumption in the standby mode and warming up is performed before the next printing. The controller is configured to set, for a predetermined time frame of a day, a standby time that the image forming apparatus is required to wait after printing before transitioning into the sleep mode from the standby mode. The length of the standby time is based on a current time and a job history including a number of print jobs that have been executed by the printer on a prior during a predetermined time period corresponding to the current time.

Figure 1:
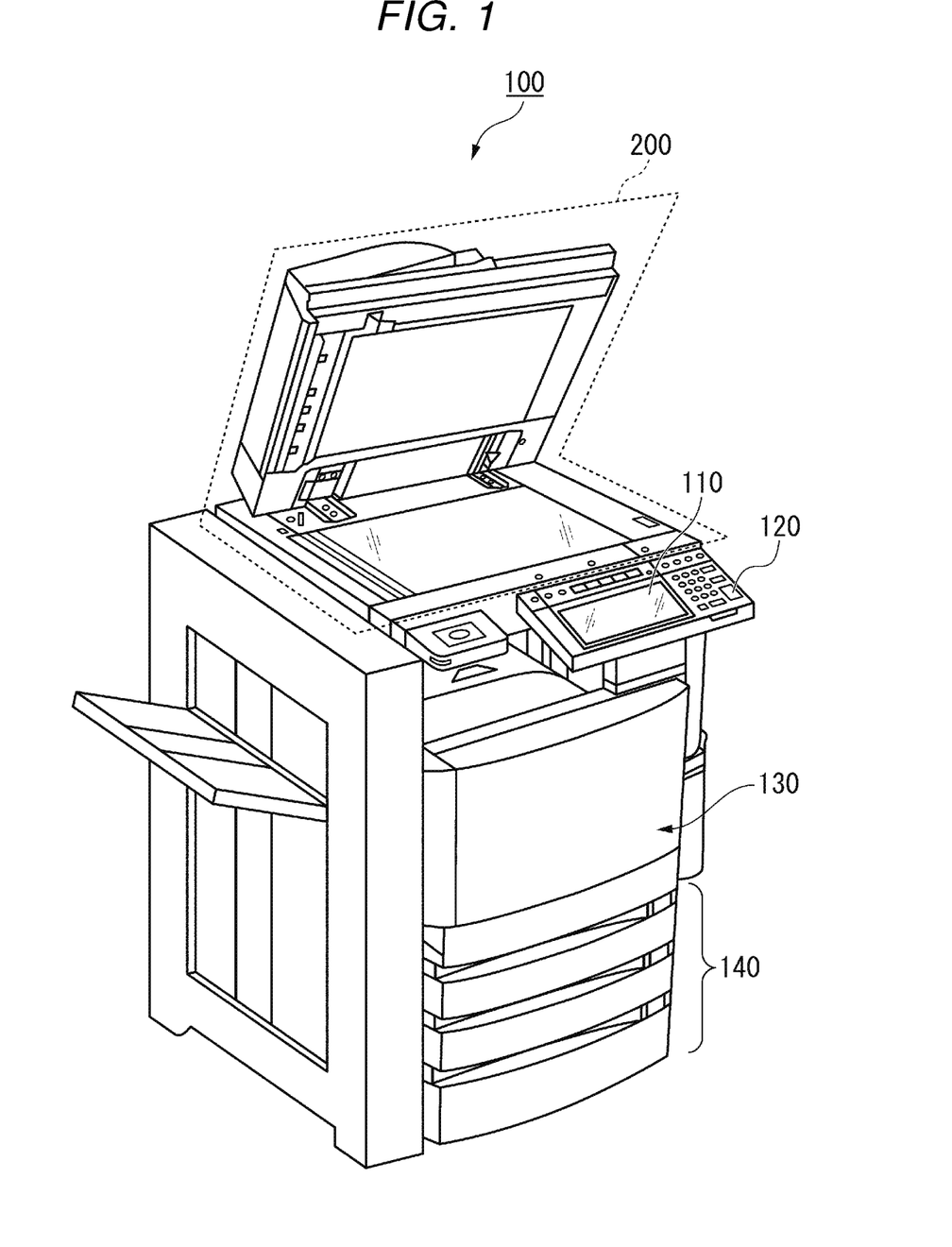
FIG. 1 is an external view of an image forming apparatus according to a first embodiment.

FIG. 1 is an external view of an image forming apparatus 100 according to a first embodiment. The image forming apparatus 100 is, for example, a multi-functional peripheral. The image forming apparatus 100 includes a display 110, a control panel 120, a printer unit 130, a sheet accommodating unit 140, and an image reading unit 200. Further, the printer unit 130 of the image forming apparatus 100 may be an apparatus for fixing a toner image or an ink jet type apparatus.

The image forming apparatus 100 forms an image on a sheet by using a developer such as a toner, and the like. The sheet is, for example, paper or label paper. The sheet may be any object as long as the image forming apparatus 100 can form an image on a surface thereof.

The display 110 is an image display apparatus such as a liquid crystal display and an organic EL (Electro Luminescence) display, and the like. The display 110 displays various types of information related to the image forming apparatus 100.

The control panel 120 includes a plurality of buttons. The control panel 120 receives an operation of a user. The control panel 120 outputs a signal corresponding to the operation performed by the user to a control unit of the image forming apparatus 100. Further, the display 110 and the control panel 120 may be configured as an integrated touch panel.

The printer unit 130 forms an image on the sheet based upon image information generated by the image reading unit 200 or the image information received via a communication path. The printer unit 130 forms the image by, for example, the following processing. An image forming unit of the printer unit 130 forms an electrostatic latent image on a photoreceptor drum based upon the image information. The image forming unit of the printer unit 130 forms a visible image by depositing the developer on the electrostatic latent image. As a specific example of the developer, toner is used. A transfer unit of the printer unit 130 transfers the visible image on the sheet. A fixing unit of the printer unit 130 fixes the visible image on the sheet by heating and pressing the sheet. The sheet on which the image is formed may be a sheet accommodated in the sheet accommodating unit 140 or may be a manually inserted sheet.

The sheet accommodating unit 140 accommodates the sheet used for image formation in the printer unit 130.

The image reading unit 200 reads image information from a target (e.g., an original document) to be read using reflected light. The image reading unit 200 records the read image information. The recorded image information may be transmitted to or received from another information processing apparatus via a network. The recorded image information may be formed as an image on the sheet by the printer unit 130.

Figure 2:
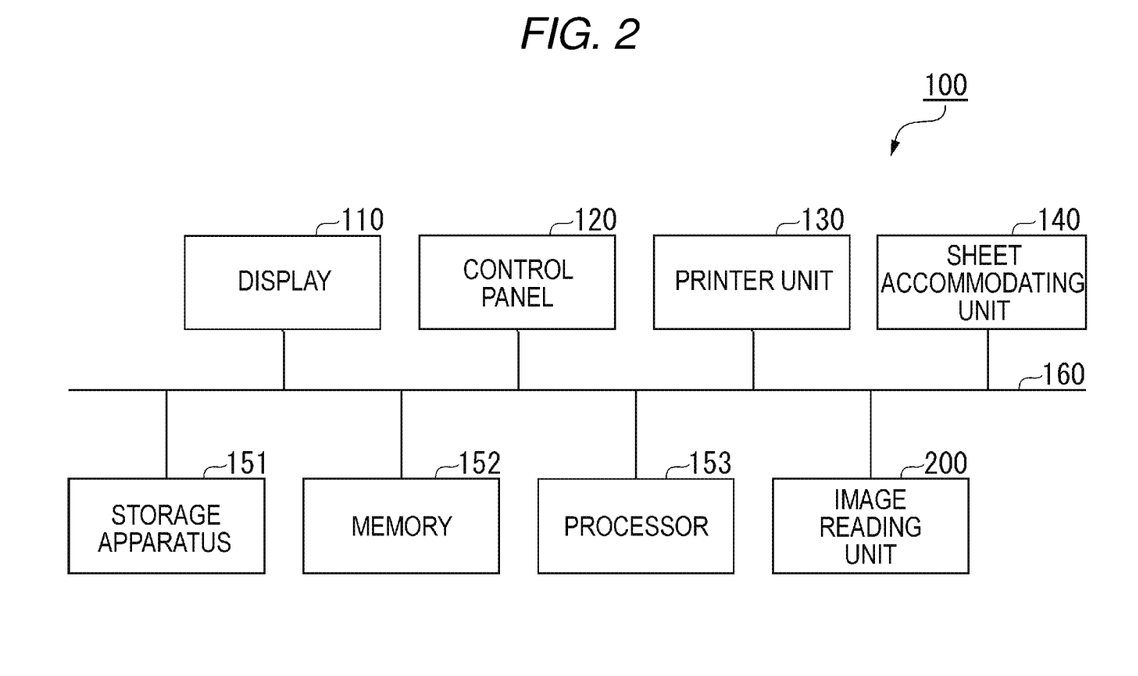
FIG. 2 is a block diagram of a hardware configuration of the image forming apparatus.

FIG. 2 is a block diagram illustrating a hardware configuration of the image forming apparatus 100 according to the embodiment. The image forming apparatus 100 includes the display 110, the control panel 120, the printer unit 130, the sheet accommodating unit 140, a storage apparatus 151, a memory 152, a processor 153, and the image reading unit 200. Further, since the display 110, the control panel 120, the printer unit 130, the sheet accommodating unit 140, and the image reading unit 200 are described above, the description thereof will be omitted. Hereinafter, the storage apparatus 151, the memory 152, and the processor 153 will be described. Further, each functional unit is connected to each other so as to be able to perform data communication via a system bus 160.

The storage apparatus 151 is configured with, for example, a hard disk or an SSD (solid state drive). The storage apparatus 151 stores various kinds of data. The various kinds of data may include information used for determining a post-printing standby time such as, for example, a design value of a power amount, a power consumption amount table, a job execution history table, and the like. The design value of the power amount includes, for example, a printing power amount, a standby power amount, and a sleep power amount. The printing power amount is a power consumption amount when printing is performed by the image forming apparatus 100. The standby power amount is a power consumption amount when the image forming apparatus 100 is in a standby mode. The standby mode is a mode state in which predetermined power is supplied to a predetermined device provided in the image forming apparatus 100. The sleep power amount is a power consumption amount when the image forming apparatus 100 is in a sleep mode. The sleep mode is a mode in which the power consumption amount thereof is smaller than that of the standby mode.

The power consumption amount table represents a model of a power consumption amount corresponding to the number of jobs executed within some predetermined time. The predetermined time may be a time interval in which the set post-printing standby time is used by the image forming apparatus 100. The post-printing standby time is time until the image forming apparatus 100 shifts to the sleep mode after printing is performed. The predetermined time may be, for example, 3,600 seconds or 7,200 seconds. However, the predetermined time may be set to any time.

Figure 3:
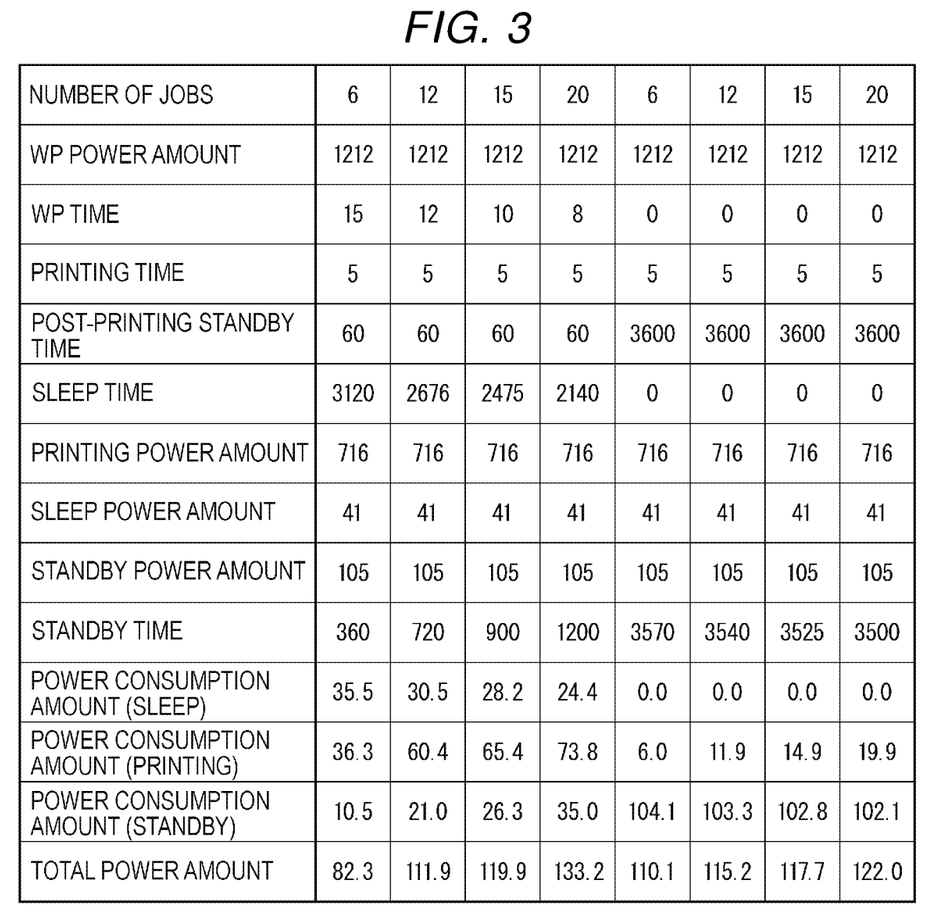
FIG. 3 is a diagram illustrating a specific example of a power consumption amount table.

FIG. 3 is a diagram illustrating a specific example of a power consumption amount table according to the embodiment. The power consumption amount table includes values for the number of jobs, a WP power amount, WP time, printing time, post-printing standby time, sleep time, a printing power amount, a standby power amount, standby time, a power consumption amount (sleep), a power consumption amount (printing), a power consumption amount (standby), and a total power consumption amount. In FIG. 3, it is assumed that the predetermined time is 3,600 seconds.

The number of jobs indicates the number of jobs executed within the predetermined time. For example, when the number of jobs is 6, it indicates that six jobs have been executed by the image forming apparatus 100 within the predetermined time. The job is, for example, a job related to printing. The job related to printing may include a job involving printing by the image forming apparatus 100, for example, a printing job received from an information processing apparatus such as a personal computer, a smart device or a tablet computer, and the like, a FAX printing job of when a FAX is received, and a copying job for copying an original document read from the image reading unit 200.

The WP power amount represents a power consumption amount per each warming-up event. The WP power amount represents a power consumption (in watts W) used to ready the image forming apparatus 100 for printing after exiting the sleep mode. According to FIG. 3, the WP power amount is 1,212 W.

The WP time is the time required for each warming up.

The printing time is time required for each printing job.

The post-printing standby time is the length of time (in seconds) until the image forming apparatus 100 shifts to the sleep mode after a printing is performed. For example, when the post-printing standby time is 60 seconds, the image forming apparatus 100 shifts to the sleep mode after the lapse of 60 seconds after printing. The post-printing standby time is one form or portion of the standby time. The post-printing standby time is the time until the image forming apparatus 100 shifts to the sleep mode after a job related to printing has been performed by the image forming apparatus 100.

The sleep time is total amount of time (in seconds) the image forming apparatus 100 is in the sleep mode during the predetermined time period. For example, when the sleep time value is 3,120 in FIG. 3, that the image forming apparatus 100 operates for 3,120 seconds in the sleep mode. The sleep time value is determined by subtracting a value obtained by multiplying the sum of the WP time, the printing time, and the post-printing standby time by the number of jobs from the predetermined time.

The printing power amount is the amount of power that would be consumed by continuous printing for the predetermined time. According to FIG. 3, if printing is performed continuously for 3,600 seconds, the power consumed by the image forming apparatus 100 is 716 W.

The sleep power amount is the power that would be consumed by the image forming apparatus 100 if the sleep mode was continued for the predetermined time. According to FIG. 3, when the image forming apparatus 100 is in the sleep mode continuously for 3,600 seconds, the amount of power consumed by the image forming apparatus 100 is 41 W.

The standby power amount is the power that would be consumed by the image forming apparatus 100 if the standby mode was maintained continuously for the predetermined time. According to FIG. 3, when the image forming apparatus is in the standby mode continuously for 3600 second, the amount of power consumed by the image forming apparatus 100 is 105 W.

The standby time is total time the image forming apparatus 100 is in the standby mode within the predetermined time. The standby time is obtained subtracting the sum of the printing time and the WP time multiplied by the number of jobs from the predetermined time then additionally subtracting the sleep time from a predetermined time.

The power consumption amount (sleep) is power consumed by the image forming apparatus 100 during the operation in the sleep mode. The power consumption amount (sleep) is calculated by multiplying the sleep power amount by a value obtained by dividing the sleep time by the predetermined time.

The power consumption amount (printing) is power consumed during the printing performed by the image forming apparatus 100. The power consumption amount (printing) is calculated as the sum of a first value obtained by multiply the printing time and the printing power amount and a second value obtained by multiply the WP time and the WP power amount, the sum of the first and second values being multiplied by the number of jobs divided by the predetermined time.

The power consumption amount (standby) is power consumed by the image forming apparatus 100 during the operation in the standby mode. The power consumption amount (standby) is calculated by multiplying the standby power amount by the standby time and dividing by a predetermined time.

The total power amount is the power consumed by the image forming apparatus 100 within a predetermined time. The total power amount is calculated by the sum of the power consumption amount (sleep), the power consumption amount (printing), and the power consumption amount (standby). The power consumption amount table shown in FIG. 3 is only one specific example. Therefore, the power consumption amount table may be configured in a form different from that of FIG. 3. For example, the power consumption amount table may indicate the number of jobs, the post-printing standby time, and the value of total power amount. The power consumption amount table is one form of information in which the number of times of the job relating to printing, the standby time, and the power consumption amount in the time frame are associated with each other.

According to FIG. 3, when the post-printing standby time is set to 60 seconds or the post-printing standby time is set to 3,600 seconds, the total power consumption amount is reversed when the number of jobs reaches 15 jobs. That is, when the number of jobs within a predetermined time is less than 15 jobs, the power consumption amount of the image forming apparatus 100 becomes reduced more in such a manner that image forming apparatus 100 shifts to the sleep mode after printing is performed. On the other hand, when the number of jobs within the predetermined time is equal to or greater than 15 jobs, the power consumption amount of the image forming apparatus 100 becomes reduced more in such a manner that the image forming apparatus does not shift to the sleep mode after printing is performed.

Figure 4:
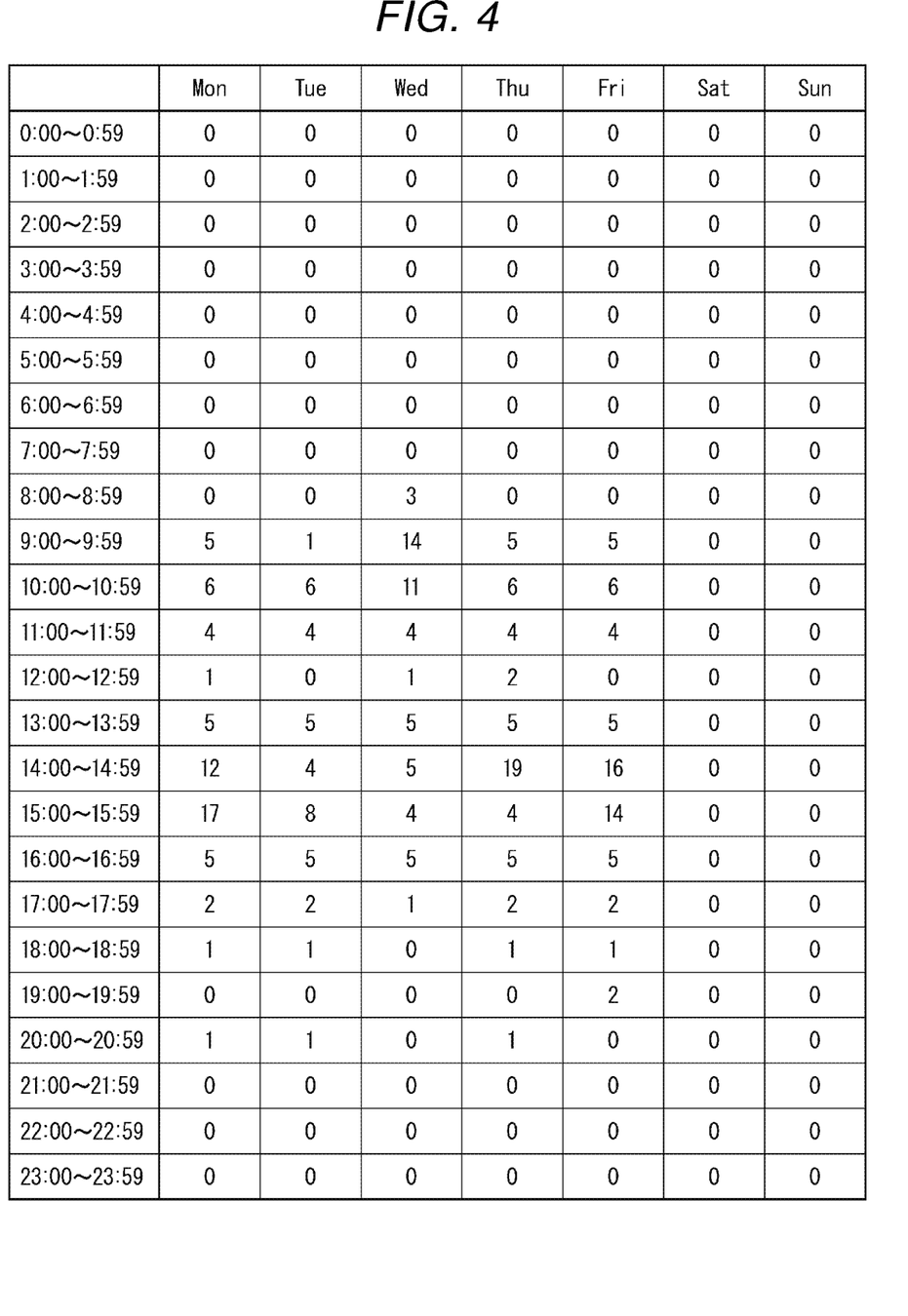
FIG. 4 is a diagram illustrating a specific example of a job execution history table.

Referring back to FIG. 2, the description of the image forming apparatus 100 will continue. The job execution history table is a table in which the number of executed jobs is counted for each predetermined time period. The job execution history table is stored by the storage apparatus 151 for one week. FIG. 4 is a diagram illustrating a specific example of the job execution history table according to the embodiment. According to FIG. 4, the number of jobs executed from 9:00 to 9:59 on Monday is 5 jobs. According to FIG. 4, the number of jobs executed from 15:00 to 15:59 on Monday is 17 jobs. Therefore, from 15:00 to 15:59 on Monday, the power consumption of the image forming apparatus 100 becomes reduced more by causing the image forming apparatus 100 to maintain the standby mode than by causing the image forming apparatus to shift to the sleep mode. Further, the job execution history table shown in FIG. 4 is only one specific example. Therefore, the job execution history table may be configured in a form different from that of FIG. 4. For example, the job execution history table may be stored by the storage apparatus 151 for a plurality of weeks instead of one week. Further, in the job execution history table of FIG. 4, all the predetermined time is divided by one hour, but is not limited thereto. For example, the job execution history table according to the embodiment may be configured so that the predetermined time varies depending on the day of the week and the time frame. For example, the predetermined time on Monday may be divided from 0:00 to 8:59, 9:00 to 17:59, 18:00 to 20:59, and 21:00 to 23:59. For example, the job execution history table according to the embodiment may be configured so that the time when the job related to printing is executed is defined as reference time, and 1,800 seconds before and after the reference time is determined as the predetermined time.

Referring back to FIG. 2, the memory 152 temporarily stores data used by each functional unit provided in the image forming apparatus 100. The memory 152 is, for example, a RAM (Random Access Memory). Further, the memory 152 may store digital data generated by the image reading unit 200. Further, the memory 152 may temporarily store either one of the job, the timer, or the number of executed jobs received via the control panel 120.

The processor 153 controls the operation of each functional unit of the image forming apparatus 100. The processor 153 loads a software program stored in the storage apparatus 151 on the memory 152, and then executes the processing by executing the software program. Here, one example with respect to the specific processing of the processor 153 will be described. The processor 153 generates the job execution history table according to the execution of the job related to printing. Specifically, the processor 153 executes the job according to an execution instruction of the job related to printing. The processor 153 acquires the job execution history table from the storage apparatus 151 when executing the job related to printing one time. The processor 153 adds one to the value of the day of the week and the time frame where the job related to printing is executed. The processor 153 records the job execution history table to which one is added in the storage apparatus 151.

Figure 5:
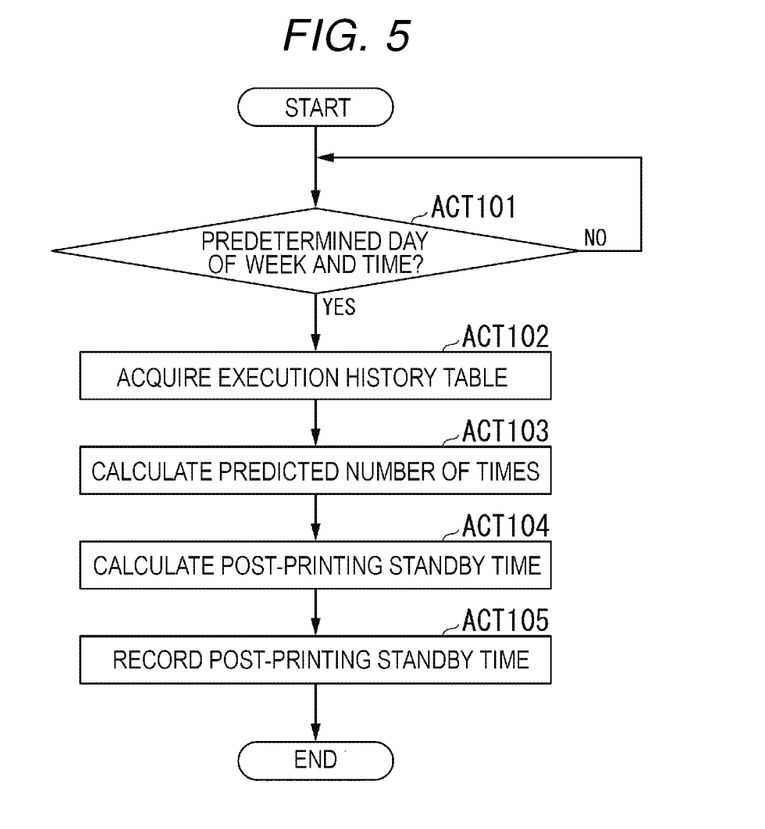
FIG. 5 is a flowchart illustrating a flow of processing for determining a post-printing standby time.

FIG. 5 is a flowchart illustrating a flow of processing for determining the post-printing standby time of the embodiment. The processor 153 of the image forming apparatus 100 executes processing for determining the post-printing standby time when a predetermined day of the week and a predetermined time come. The processor 153 of the image forming apparatus 100 determines whether or not the predetermined day of the week and the predetermined time come (ACT101). For example, the predetermined day of the week and the predetermined time may be 00:00 AM every Sunday, and the like. The predetermined day of the week and the predetermined time may be freely determined. When the predetermined day of the week and the predetermined time do not come (ACT101: NO), the processor 153 proceeds to ACT101. When the predetermined day of the week and the predetermined time come (ACT101: YES), the processor 153 acquires the execution history table from the storage apparatus 151 (ACT102).

The processor 153 calculates the predicted number of times (ACT103). The predicted number of times represents a predicted value of the number of times of performing the job related to printing in a predetermined time frame. The predetermined time frame is, for example, a predetermined time recorded in the execution history table. For example, the predetermined time frame is a time frame of from 0:00 to 0:59, and the like on Monday in the execution history table. The processor 153 determines the predicted number of times based upon the number of times of the job related to printing executed by the image forming apparatus 100 in the same time frame as the predetermined time frame in the past. For example, the processor 153 determines the predicted number of times from 0:00 to 0:59 on Monday based upon a numerical value from 0:00 to 0:59 on Monday stored in the execution history table that is recorded in the storage apparatus 151. The processor 153 may use the numerical value as it is being stored in the execution history table as the predicted number of times.

The processor 153 calculates the post-printing standby time based upon the power consumption amount table and the predicted number of times (ACT104). Specifically, the processor 153 acquires the power consumption amount table recorded in the storage apparatus 151. Next, the processor 153 determines a threshold value based upon the power consumption amount table. The threshold value indicates the number of times of the job capable of reducing the power consumption amount of the image forming apparatus 100 if the image forming apparatus 100 shifts to a power saving mode after the printing job is performed in the predetermined time frame. When the predicted number of times is smaller than the threshold value, the processor 153 determines that it is desirable to shift the image forming apparatus 100 to the power saving mode after the job related to printing is performed. When the predicted number of times is equal to or greater than the threshold value, the processor 153 determines that it is desirable not to shift the image forming apparatus 100 to the power saving mode after the job related to printing is performed. The processor 153 compares the values of the post-printing standby time with the total power amounts in columns where the values of the number of jobs are the same in the power consumption amount table. As a result of the comparison therebetween, the processor 153 specifies the number of jobs of a case where the value of the post-printing standby time is small and the total power amount becomes large. The processor 153 determines the minimum number of jobs among the specified number of jobs as a threshold value. In the case of FIG. 3, the threshold value is 15.

The processor 153 compares the determined threshold value with the predicted number of times. When the predicted number of times is smaller than the threshold value, the processor 153 determines a time shorter than a value obtained by dividing the time of the predetermined time frame by the predicted number of times as the post-printing standby time. For example, when the time of the predetermined time frame is 3,600 seconds and the predicted number of times is 10, the processor 153 determines a time shorter than 360 as the post-printing standby time. When the predicted number of times is equal to or greater than the threshold value, the processor 153 determines a time longer than a value obtained by dividing the time of the predetermined time frame by the predicted number of times as the post-printing standby time. For example, when the time of the predetermined time frame is 3,600 seconds and the predicted number of times is 20, the processor 153 determines a time longer than 180 as the post-printing standby time. The processor 153 determines the post-printing standby time in all the time frames recorded in the execution history table. The processor 153 records the determined post-printing standby time in the storage apparatus 151 (ACT105).

In the image forming apparatus 100 configured as described above, the control unit controls the image forming apparatus 100 in either one of a plurality of operation modes including the standby mode in which a predetermined power is supplied to a predetermined device included in the own apparatus and the sleep mode whose power consumption is smaller than that of the standby mode. The control unit determines the post-printing standby time until the image forming apparatus 100 shifts to the sleep mode after the job related to printing is performed by the image forming apparatus 100 based upon the number of times of the job related to printing performed by the image forming apparatus 100 in the predetermined time frame. Accordingly, the processor 153 can appropriately shift the image forming apparatus 100 to the standby mode and the sleep mode based upon the number of times of the job. Therefore, the processor 153 can suppress the power consumption amount of the image forming apparatus 100. Further, the image forming apparatus 100 maintains the standby mode even after the job related to printing is performed in a time frame where the number of times of executing the job related to printing is large. Accordingly, a user is not required to wait for the image forming apparatus 100 to return from the sleep mode. Therefore, the image forming apparatus 100 can improve the convenience.

[Modification]

As described above, when the predicted number of times is equal to or greater than the threshold value, the processor 153 determines the time longer than the value obtained by dividing the time of the predetermined time frame by the predicted number of times as the post-printing standby time, but is not limited thereto. For example, the processor 153 may use the same time as the predetermined time frame as the post-printing standby time. For example, when the predetermined time is 3,600 seconds, the processor 153 may determine the post-printing standby time as 3,600 seconds.

As described above, the processor 153 may use the numerical value as it is being stored in the execution history table as the predicted number of times, but is not limited thereto. For example, when the plurality of execution history tables are recorded in the storage apparatus 151, the processor 153 may determine the predicted number of times based upon statistical information on the plurality of execution history tables. Specifically, the processor 153 may determine the most frequent value as the predicted number of times, may determine a central value as the predicted number of times, and may determine an average value as the predicted number of times in a predetermined time frame.

Second Embodiment

Next, the image forming apparatus 100 according to a second embodiment will be described. The image forming apparatus 100 according to the second embodiment determines whether the image forming apparatus should have been in the sleep mode or should have been in the standby mode when the job related to printing is performed. The image forming apparatus 100 according to the second embodiment is different from that of the first embodiment in that a determination result is recorded in the job execution history table, but other configurations are the same as each other. Hereinafter, a point different from the first embodiment will be described.

Figure 6:
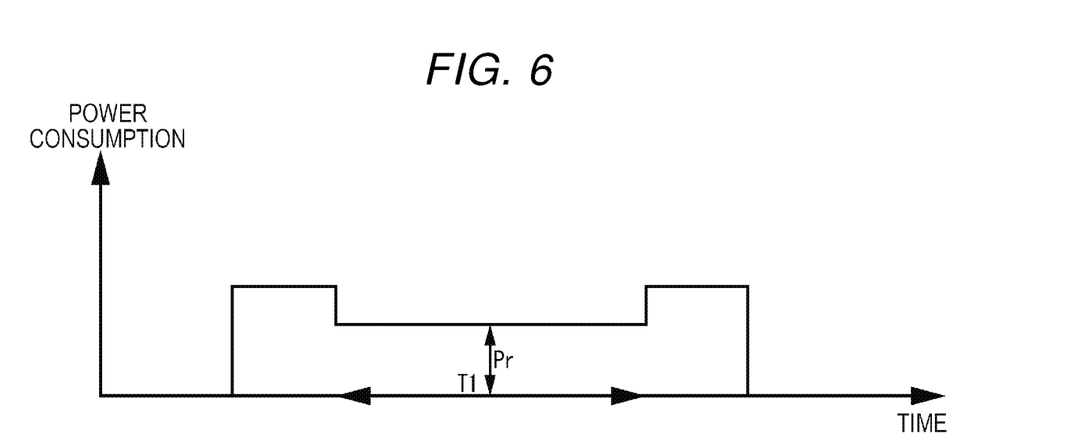
FIG. 6 is a diagram illustrating a specific example showing a change in a power consumption amount in a case the image forming apparatus transitions into a standby mode after printing.

FIG. 6 is a diagram illustrating a specific example showing a change in a power consumption amount in a case the image forming apparatus 100 according to the second embodiment transitions into the standby mode after printing. In FIG. 6, a vertical axis represents power consumption and a horizontal axis represents time. T1 represents the time elapsed from the end of a job related to a previous printing to the start of a job related to the next printing. That is, T1 represents the time during the standby mode. Pr represents power consumption during the standby mode. A section where the power consumption is larger than Pr at both ends of T1 represents the time during the printing.

Figure 7:
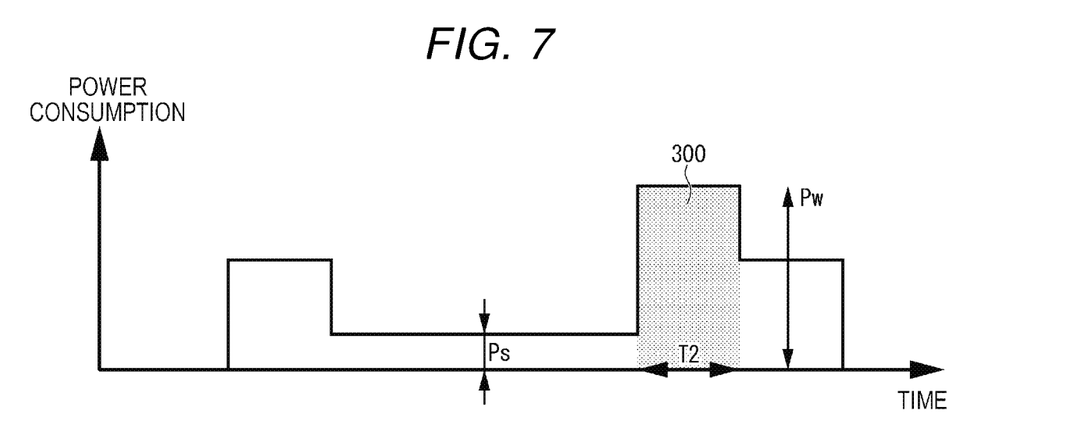
FIG. 7 is a diagram illustrating a specific example showing a change in a power consumption amount in a case the image forming apparatus stays in a sleep mode after printing.

FIG. 7 is a diagram illustrating a specific example showing a change in a power consumption amount in a case the image forming apparatus 100 according to the second embodiment stays in the sleep mode after printing. In FIG. 7, a vertical axis represents power consumption and a horizontal axis represents time. T2 represents the execution time of the job related to printing. Pw represents power consumption during the execution of the job related to printing. Ps represents power consumption during the sleep mode. An area 300 in FIG. 7 represents a power consumption amount during the printing.

The processor 153 allows the job related to printing executed by the image forming apparatus 100 and a determination result to associate with each other, and then records the associated one in the storage apparatus 151 in the predetermined time frame. The determination result indicates whether or not the power consumption can be reduced when the image forming apparatus 100 has been shifted to the sleep mode. The processor 153 determines the determination result based upon the time elapsed from the job related to printing executed at a first previous time and the printing time of the job related to printing. Specifically, the processor 153 compares T1 with a calculated value that is calculated by multiplying T2 by a value obtained by dividing Pw by Pr. When the calculated value is equal to or greater than T1, the processor 153 determines that the power consumption can be reduced more by shifting the image forming apparatus 100 to the sleep mode.

The processor 153 records the determination result in the execution history table. Specifically, the processor 153 records the number of times of executing the job related to printing and the determination result in association with each other in the time frame where the job related to printing of the execution history table is executed. The determination result records the number of times that the sleep mode is desirable to be set and the number of times that the sleep mode is not desirable to be set.

The processor 153 determines the post-printing standby time based upon the determination result. Specifically, the processor 153 compares the number of times that is determined that the power consumption can be reduced when the image forming apparatus 100 shifts to the sleep mode with the number of times that is determined that the power consumption can be reduced when the image forming apparatus 100 does not shift to the sleep mode for each time frame of the execution history table. When the number of times that is determined that the power consumption can be reduced when the image forming apparatus 100 shifts to the sleep mode is greater than the number of times that is determined that the power consumption can be reduced when the image forming apparatus 100 does not shift to the sleep mode, the processor 153 divides the time of the predetermined time frame by the number of times of the executing the job related to printing in the time frame. The processor 153 determines a time shorter than a value obtained by the aforementioned division as the post-printing standby time. For example, when the time in the predetermined time frame is 3,600 seconds and the number of times of the job execution is 15, the processor 153 determines a time shorter than 240 as the post-printing standby time. When the number of times that is determined that the power consumption can be reduced when the image forming apparatus 100 shifts to the sleep mode is less than the number of times that is determined that the power consumption can be reduced when the image forming apparatus 100 does not shift to the sleep mode, the processor 153 divides the time of the predetermined time frame by the number of times of executing the job related to printing in the time frame. The processor 153 determines a time longer than a value obtained by the aforementioned division as the post-printing standby time. For example, when the time in the predetermined time frame is 3,600 seconds and the number of times of the job execution is 15, the processor 153 determines a time longer than 240 as the post-printing standby time.

Therefore, since the processor 153 can shift the power consumption amount of the image forming apparatus 100 to the sleep mode or the standby mode according to the actual power consumption amount, the power consumption amount thereof can be suppressed. Further, a user is not required to wait for the image forming apparatus 100 to return from the sleep mode. As a result, the image forming apparatus 100 can improve the convenience.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
   a printer for executing print jobs; and
   a controller configured to:
   set an operational mode of the image forming apparatus to be one of a plurality of modes including a standby mode in which warming up is not performed before printing and a sleep mode in which power consumption of the image forming apparatus is lower than power consumption in the standby mode and warming up is performed before printing; and
   set a standby time that the image forming apparatus is required to wait after printing before transitioning to the sleep mode from the standby mode, the length of the standby time being based on a current time and a job history including a number of print jobs executed by the printer on a prior day during a predetermined time period corresponding to the current time.

2. The image forming apparatus according to claim 1, wherein the controller is configured to determine a predicted number of print jobs expected to be executed during a predetermined time period of the current day based on the job history, and set the standby time for the predetermined time period of the current day based on the predicted number.

3. The image forming apparatus according to claim 2, wherein
   when the predicted number is less than a threshold value, the controller determines the predicted number to be a first value, and
   when the predicted number is greater than the threshold value, the controller determines the predicted number to be a second value greater than the first value.

4. The image forming apparatus according to claim 3, wherein the first value is less than a value equal to a time period of the predetermined time period divided by the predicted number, and the second value is greater than a value equal to a time period of the predetermined time period divided by the predicted number.

5. The image forming apparatus according to claim 2, wherein the predicted number is equal to a number of print jobs executed by the printer in the predetermined time period of the prior day.

6. The image forming apparatus according to claim 2, wherein the predicted number is equal to a most frequent value for the number of print jobs executed by the printer in predetermined time periods corresponding to the current time over a plurality of prior days.

7. The image forming apparatus according to claim 2, wherein the predicted number is equal to a median value of the numbers of print jobs executed by the printer in predetermined time periods corresponding to the current time for a plurality of prior days.

8. The image forming apparatus according to claim 1, wherein the controller is configured to generate, for each print job executed by the printer, a determination result for whether a transition from the standby mode to the sleep mode or staying in the standby mode would have saved more power, and set the standby time based on the determination result.

9. The image forming apparatus according to claim 8, wherein the controller is configured to generate the determination result based on an amount of time taken to complete a most recent print job and a length of time since completion of the most recent print job.

10. The image forming apparatus according to claim 1, wherein the prior day is the same day of week as the current day.

11. A method for controlling an image forming apparatus including a printer for executing print jobs, the method comprising:
    setting an operational mode of the image forming apparatus to be one of a plurality of modes including a standby mode in which warming up is not performed before printing and a sleep mode in which power consumption of the image forming apparatus is lower than power consumption in the standby mode and warming up is performed before printing; and
    setting a standby time that the image forming apparatus is required to wait after printing before transitioning to the sleep mode from the standby mode, the length of the standby time being based on a current time and a job history including a number of print jobs executed by the printer on a prior day during a predetermined time period corresponding to the current time.

12. The method according to claim 11, further comprising:
    determining a predicted number of print jobs expected to be executed during the predetermined time period of the current day based on the job history, and setting the standby time for the predetermined time frame of the current day based on the predicted number.

13. The method according to claim 12, wherein
    when the predicted number is less than a threshold value, the predicted number is set to be a first value, and
    when the predicted number is greater than the threshold value, the predicted number is set to be a second value greater than the first value.

14. The method according to claim 13, wherein the first value is less than a value equal to a time period of the predetermined time period divided by the predicted number, and the second value is greater than a value equal to a time period of the predetermined time period divided by the predicted number.

15. The method according to claim 12, wherein the predicted number is equal to a number of print jobs executed by the printer in the predetermined time period of the prior day.

16. The method according to claim 12, wherein the predicted number is equal to a most frequent value for the number of print jobs executed by the printer in predetermined time periods corresponding to the current time over of a plurality of prior days.

17. The method according to claim 12, wherein the predicted number is equal to a median value of the numbers of print jobs that executed by the printer in predetermined time periods corresponding to the current time over of a plurality of prior days.

18. The method according to claim 11, further comprising:
    generating, for each print job executed by the printer, a determination result for whether a transition from the standby mode to the sleep mode or staying in the standby mode would have saved more power, and setting the length of the standby time based on the determination result.

19. The method according to claim 18, wherein the determination result is generated based on an amount of time taken to complete a most recent print job and a length of time period since completion of the most recent print job.

20. The method according to claim 11, wherein the prior day is the same day of the week as the current day.

* * * * *